Oct. 15, 1935.　　　　W. A. PRIEST　　　　2,017,293
POP CORN VENDING MACHINE
Filed Oct. 28, 1931　　　10 Sheets-Sheet 1
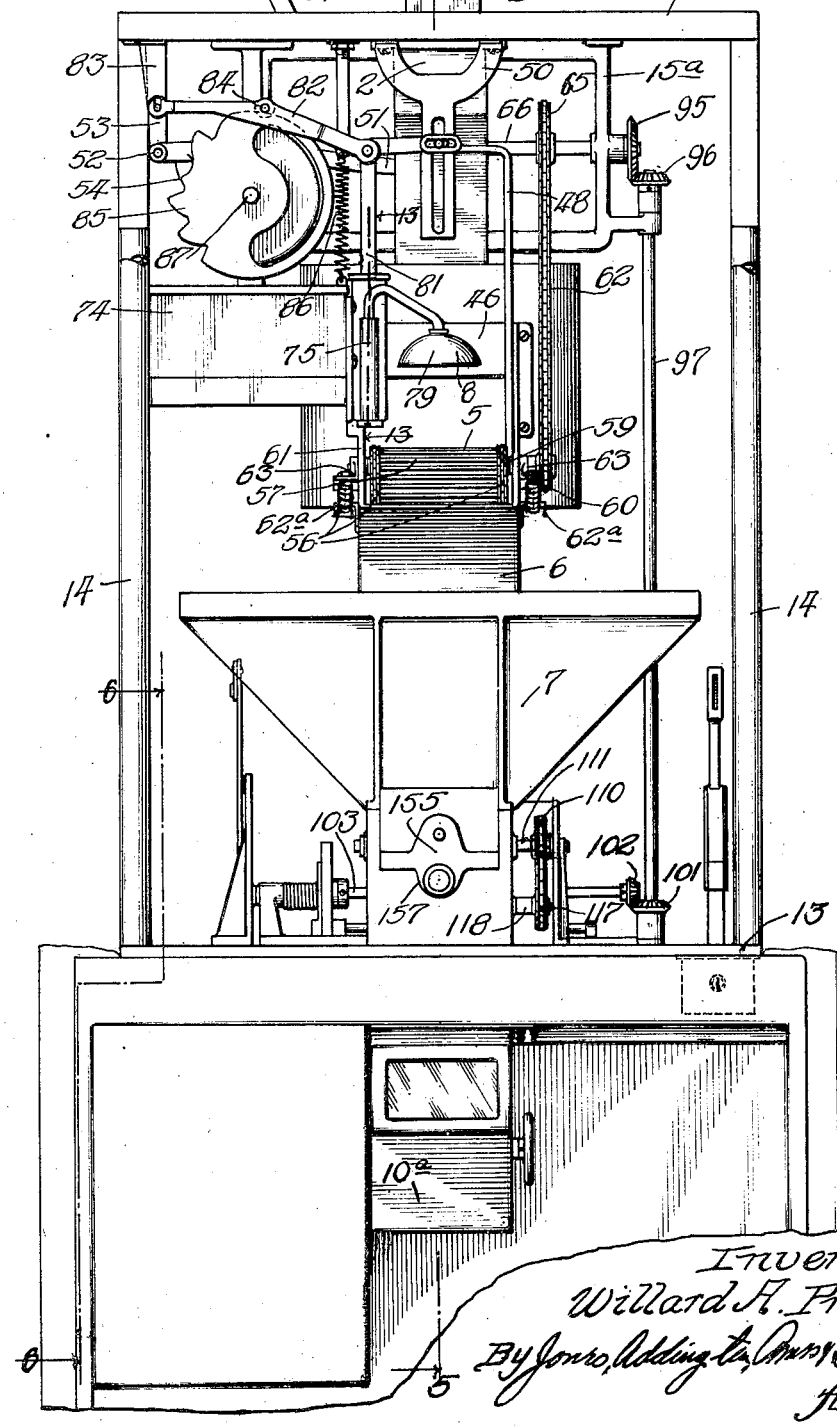

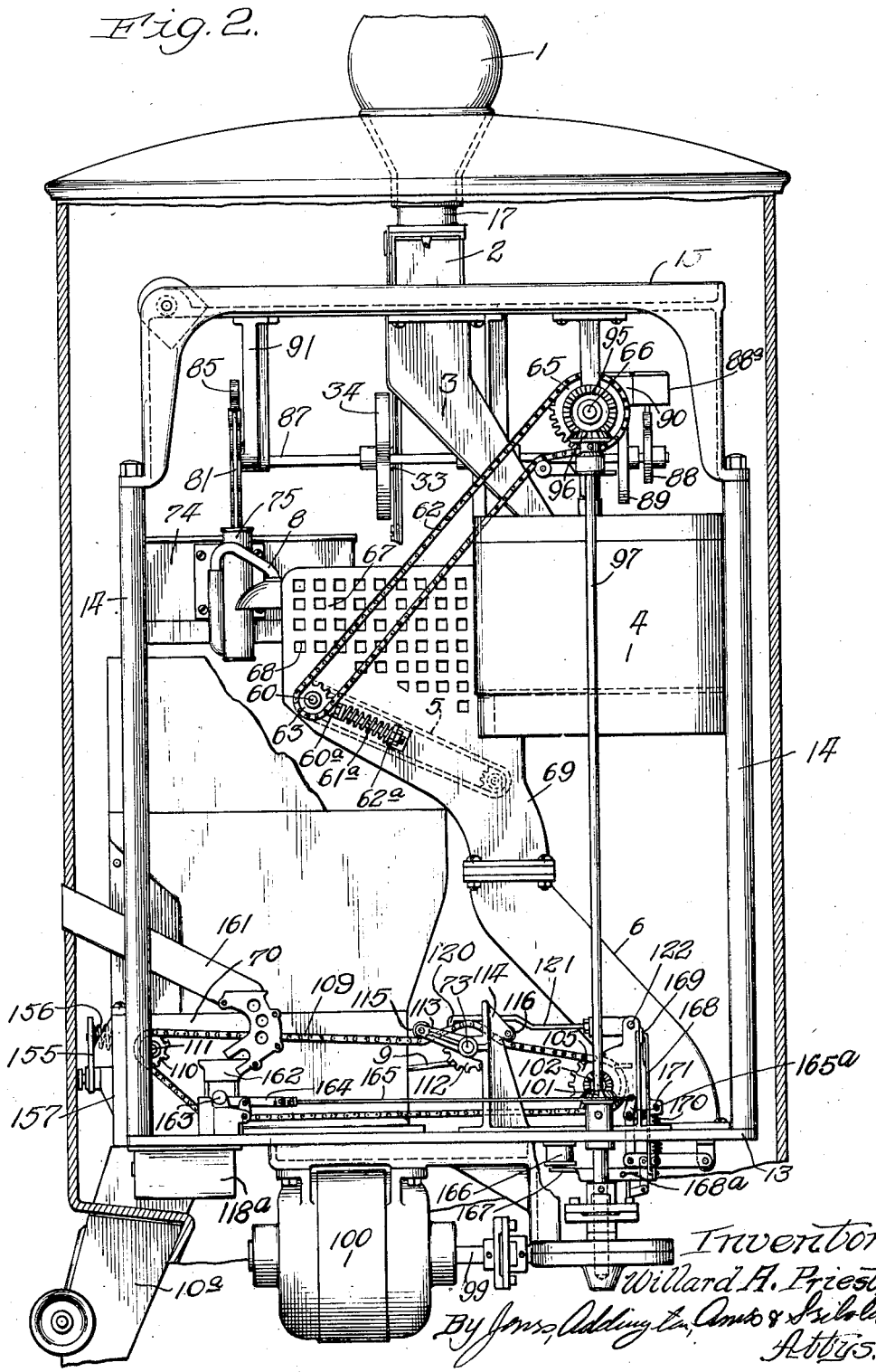

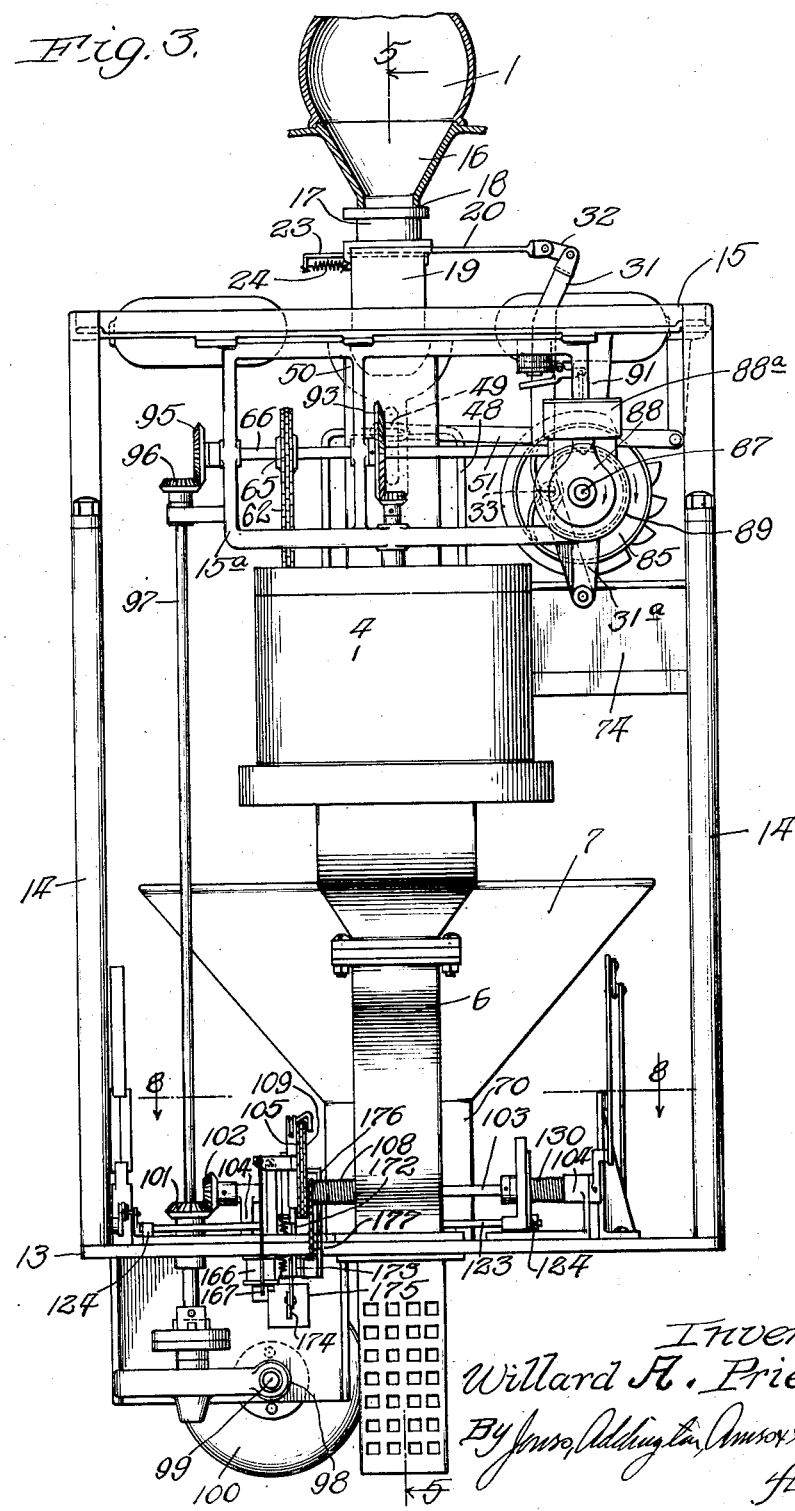

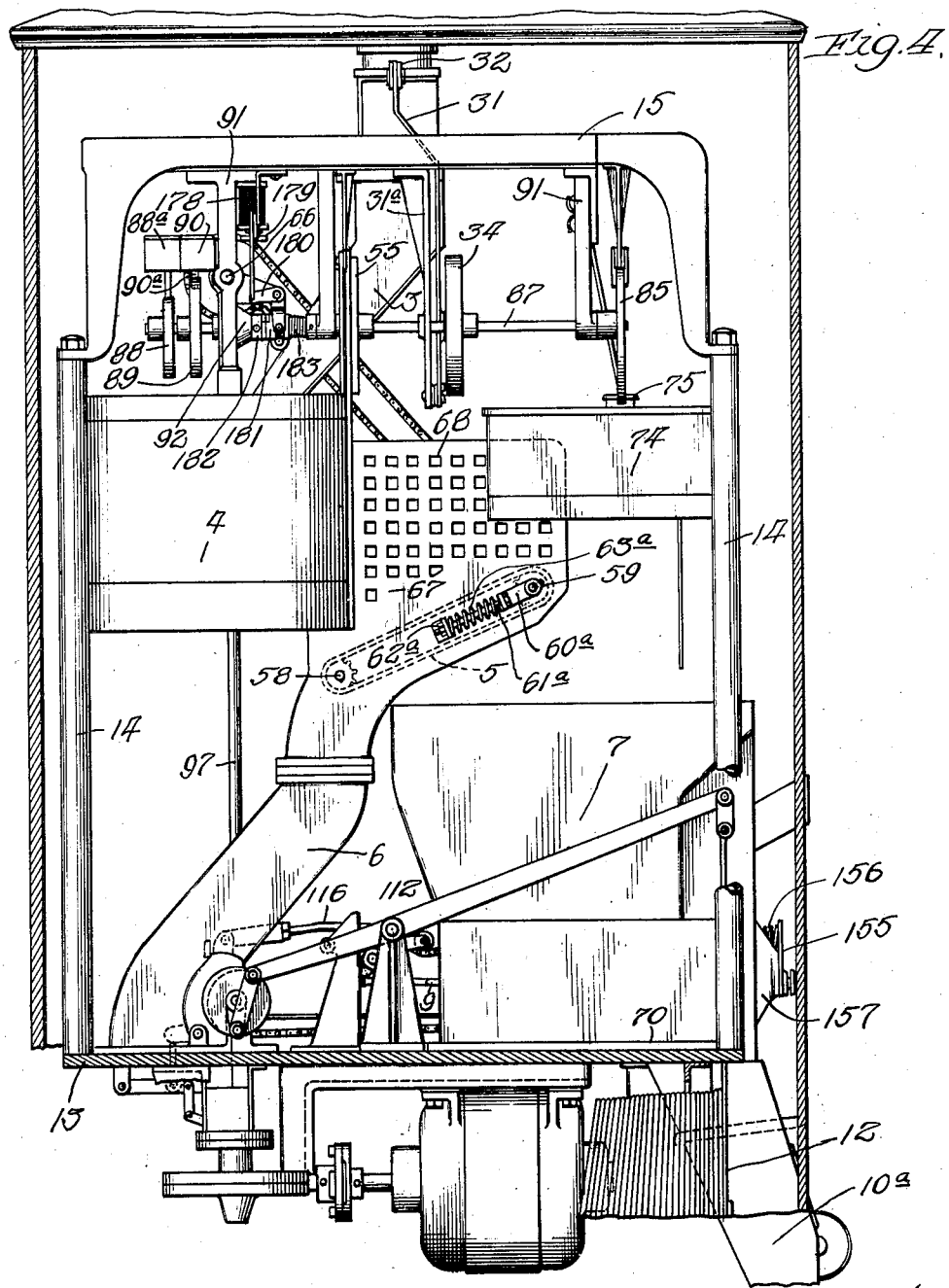

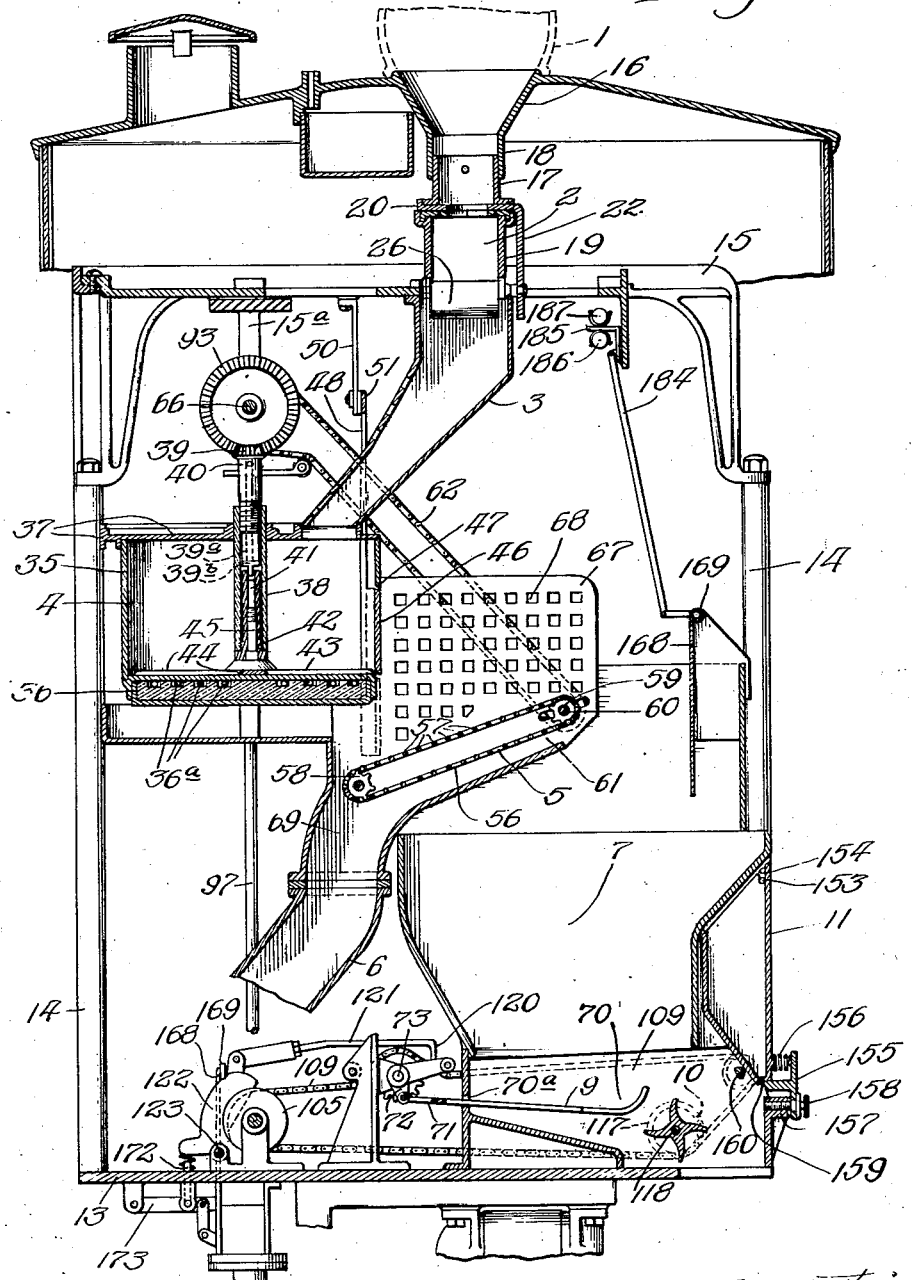

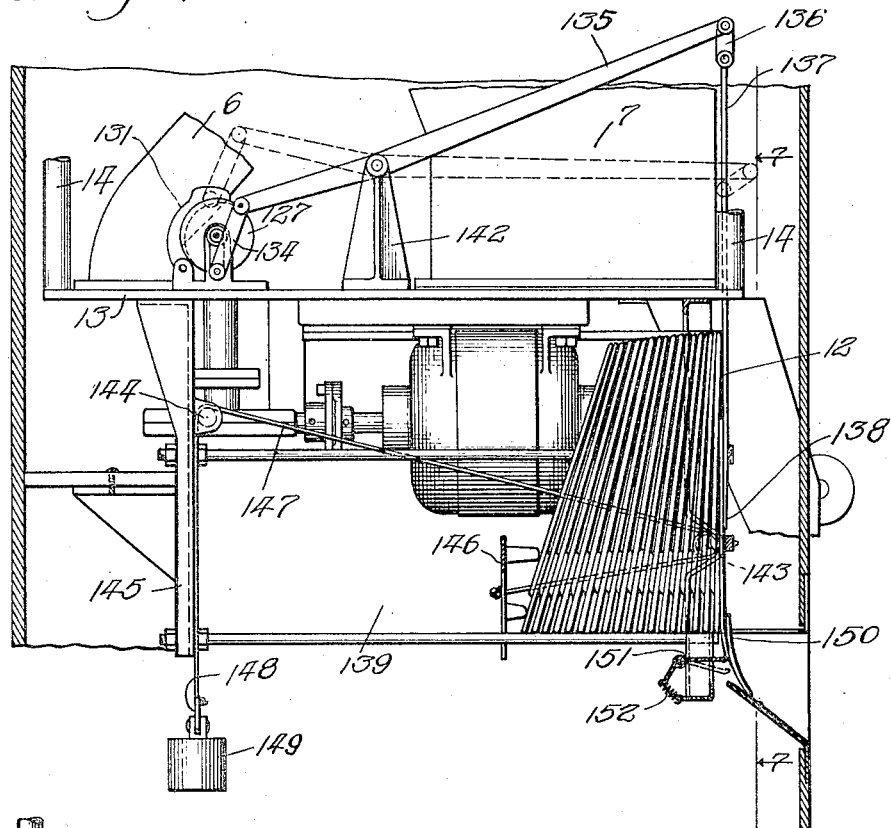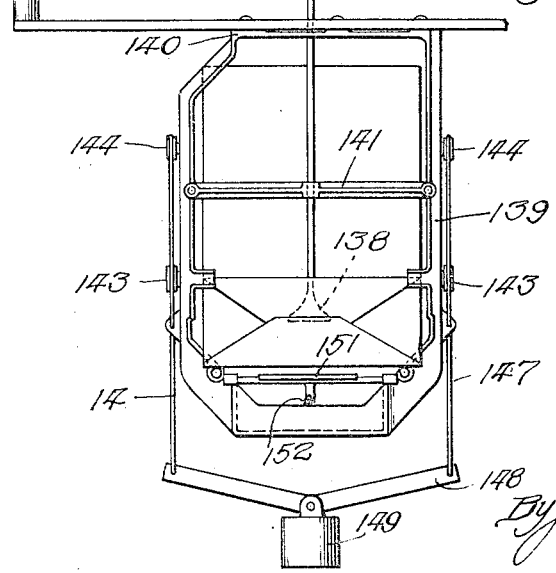

Oct. 15, 1935.   W. A. PRIEST   2,017,293
POP CORN VENDING MACHINE
Filed Oct. 28, 1931   10 Sheets-Sheet 7
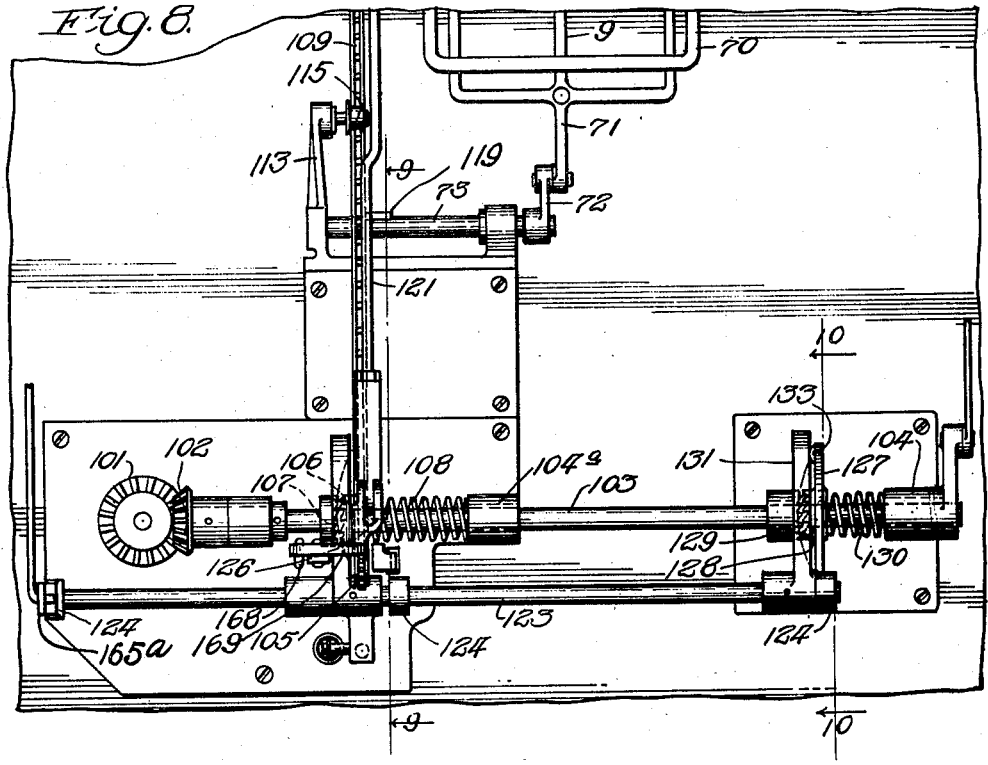
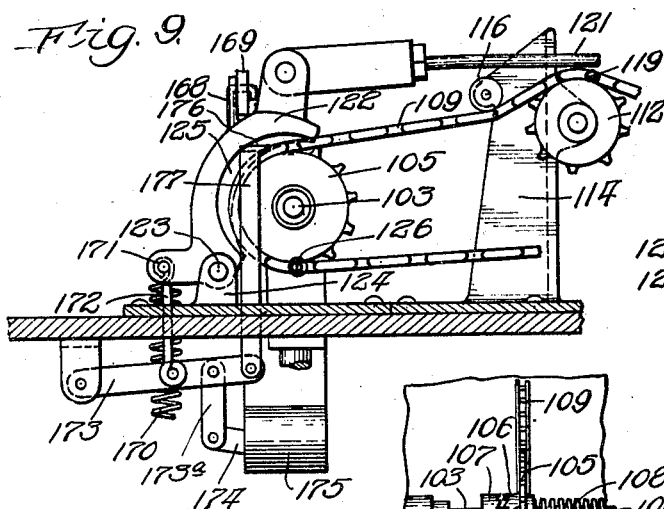
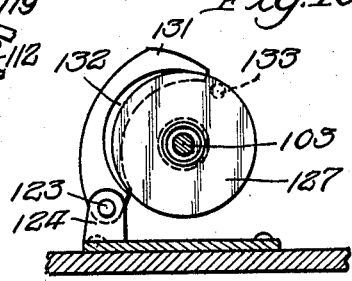
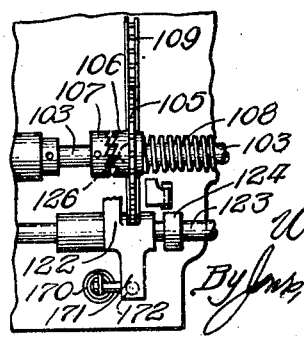

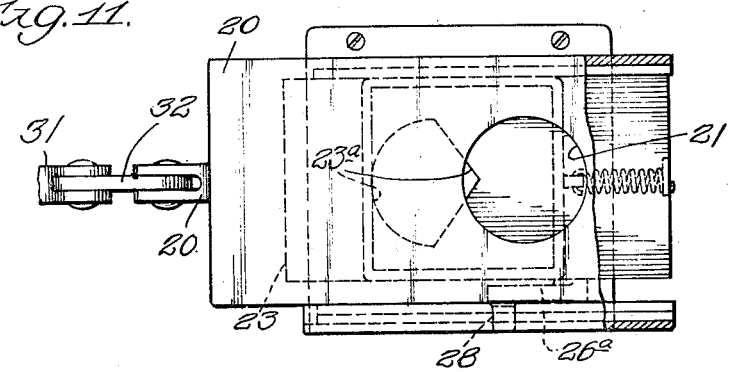
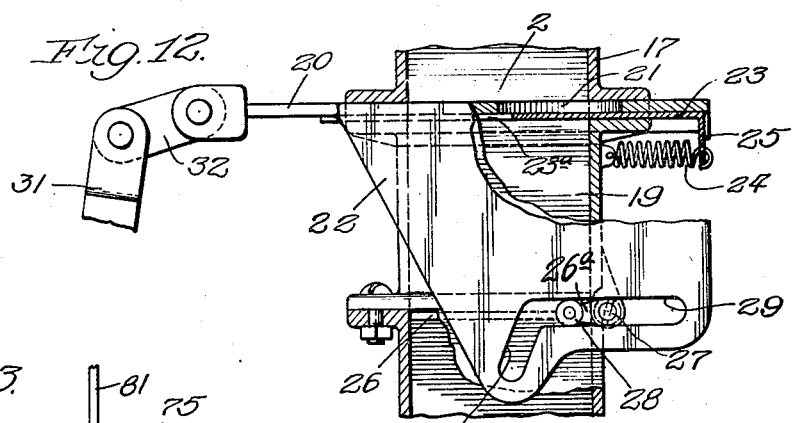
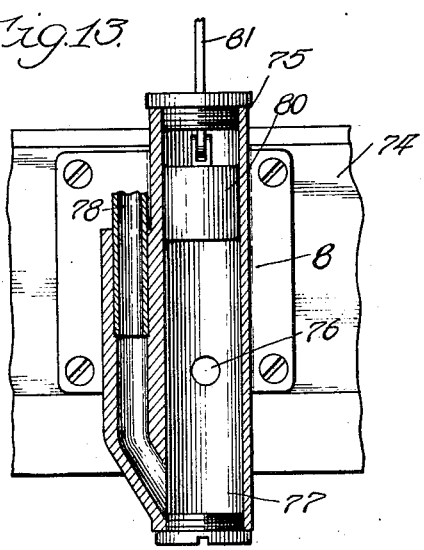
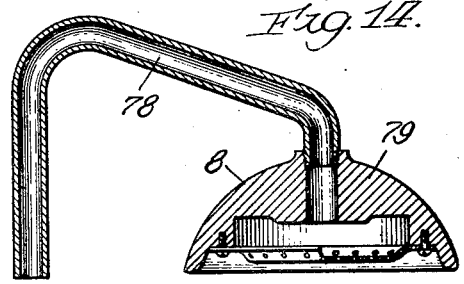

Oct. 15, 1935.  W. A. PRIEST  2,017,293
POP CORN VENDING MACHINE
Filed Oct. 28, 1931  10 Sheets-Sheet 9

Inventor
Willard A. Priest,
By Jones, Addington, Ames & Seibold
Attys

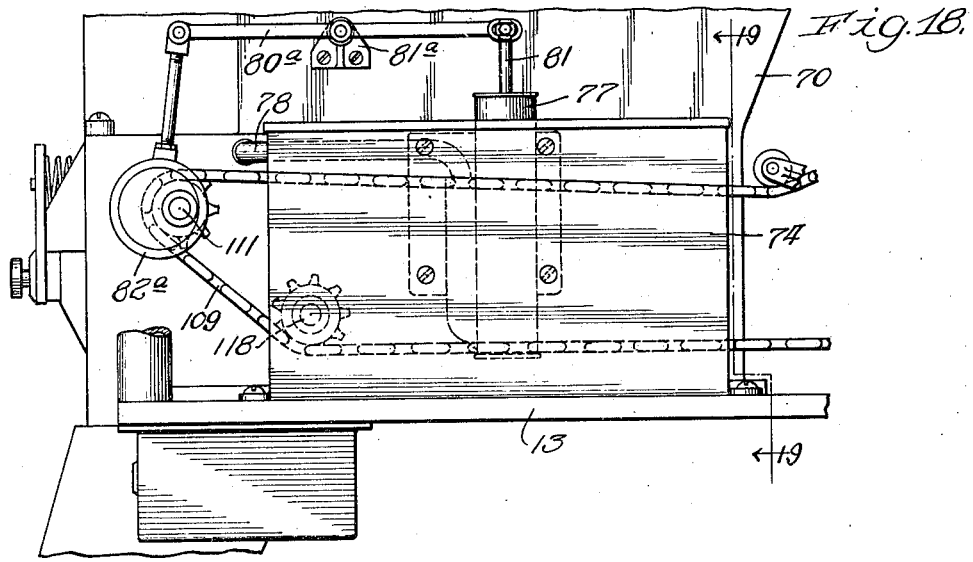
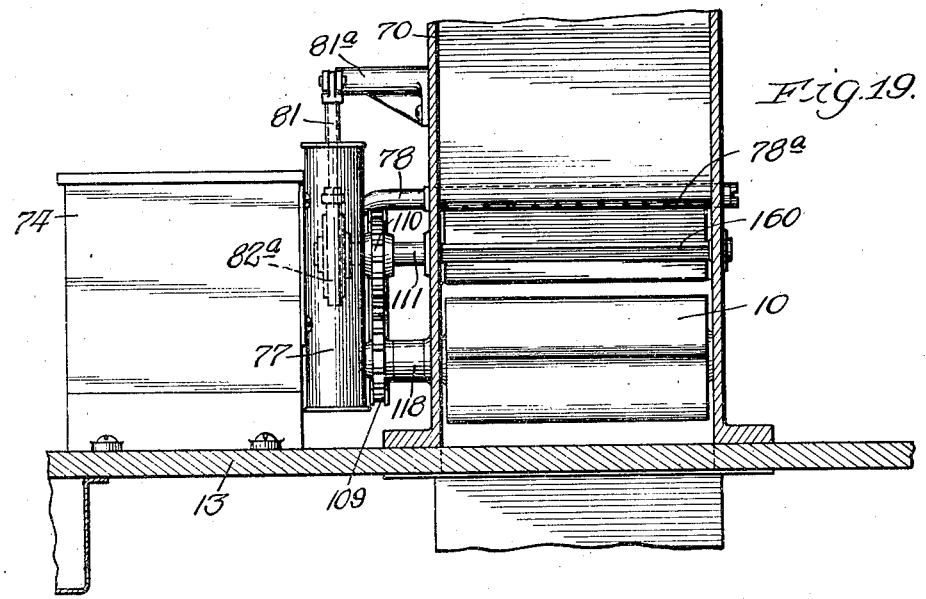

Patented Oct. 15, 1935

2,017,293

UNITED STATES PATENT OFFICE 2,017,293

POP CORN VENDING MACHINE

Willard A. Priest, Chicago, Ill.

Application October 28, 1931, Serial No. 571,610

23 Claims. (Cl. 53—4)

This invention relates to a pop-corn vending machine and has special reference to a vending machine which is automatically operated and coin controlled.

More particularly this invention relates to a pop-corn vending machine in which fresh corn is automatically measured and fed to a skillet, the pop-corn from the skillet being screened and treated with salt and butter, and delivered to the purchaser in a sequence of operations which are automatic and coin controlled.

One of the objects of this invention is to provide a vending machine in which the series of steps necessary for supplying salted and buttered pop-corn succeed each other in proper sequence and in which the mechanisms for producing this sequence are removed from the control of the operator after the device is once in operation.

Another object of this invention is to provide a vending machine as above indicated which, when a supply of pop-corn is taken therefrom, will be automatically operated to produce a fresh supply of pop-corn for a subsequent purchaser, whereby a fresh supply of pop-corn may be at hand continuously.

Another object of this invention is to provide a vending machine as above indicated, which, when a certain predetermined amount of corn has been popped, will act merely as a vending machine until some of the pop-corn is vended, after which it will operate to further pop the corn as well as vend the same.

A further object of this invention is to provide a vending machine which will require a minimum amount of attention during a period of time after its initial operation.

A still further object of this invention is to provide a vending machine as above indicated which may be readily cleansed and kept in a sanitary condition.

Another object of this invention is to provide a vending machine of the type referred to above in which all of the heating elements are thermally controlled.

It is also the object of this invention to provide a vending machine as hereinbefore referred to having a new and improved coin-controlling mechanism.

Still another object of this invention is to provide a new and improved measuring device for measuring the fresh corn to be fed to the skillet, so that the proper amount is supplied to the skillet for cooking.

A further object of this invention is to provide a new and improved form of salting means for automatically supplying the salt to the corn.

A still further object of this invention is to provide a vending machine as above referred to having a new and improved form of a device for supplying bags to the purchased which are to be used for receiving a supply of the popped corn.

Further objects and advantages of this invention will be apparent from the following description when taken together with the accompanying drawings, in which latter:

Figure 1 is a front elevational view of the pop-corn machine with the casing removed therefrom;

Fig. 2 is a side elevation of one side of the pop-corn vending machine embodying this device;

Fig. 3 is a rear elevational view of the side of the machine;

Fig. 4 is a side elevational view showing the side opposite that of Fig. 2;

Fig. 5 is a side elevational view taken on the line 5—5 of Fig. 3;

Fig. 6 is a side elevational view of the paper bag dispensing apparatus taken on the line 6—6 of Fig. 1;

Fig. 7 is a view taken on the line 7—7 of Fig. 6;

Fig. 8 is a view taken on the line 8—8 of Fig. 3;

Fig. 9 is a side elevational view taken on the line 9—9 of Fig. 8;

Fig. 10 is a side elevational view taken on the line 10—10 of Fig. 8;

Figure 15:
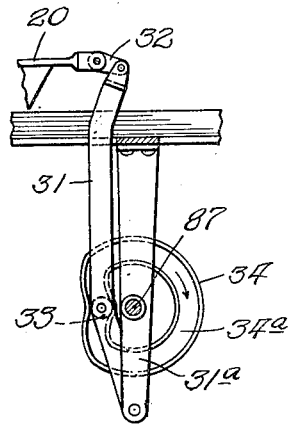
Figure 16:
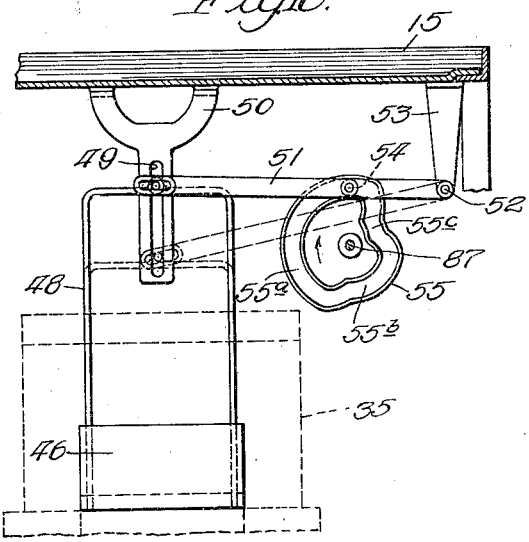
Figure 17:
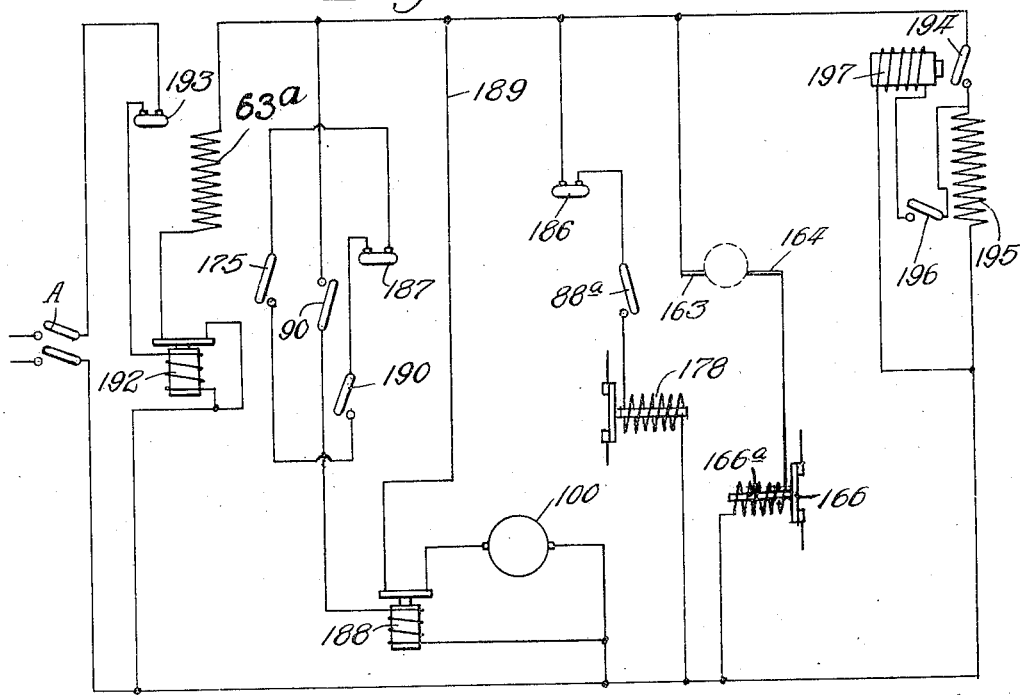

Fig. 10—A is an enlarged plan view of the sprocket wheel and clutch shown in Fig. 8;

Fig. 11 is a top plan view taken on the line 11—11 of Fig. 1, showing the measuring device;

Fig. 12 is a side elevational view of the measuring device shown in Fig. 11;

Fig. 13 is a cross-sectional view of the butter pump taken on the line 13—13 of Fig. 1;

Fig. 14 is a cross-sectional view partially in elevation of the nozzle of the butter pump attached to the end of the supply tube;

Fig. 15 is an elevational view of the cam and lever for operating the measuring device;

Fig. 16 is an elevational view of the cam and lever for operating the oven gate;

Fig. 17 is a wiring diagram of electrical circuits embodied in this invention;

Fig. 18 is a side elevational view of a modified arrangement of butter pump; and Fig. 19 is a rear elevational view of the device shown in Fig. 18.

*General structure and operation*

Referring now to the drawings, and more particularly to Fig. 5 thereof, a general description of the operation of the mechanism will now be given. Fresh corn is contained in a corn holder 1 and is held therein until it is desired to fill the measuring device 2. After a charge of fresh corn is taken into the measuring device 2 this charge is fed through a chute 3 to an oven or skillet 4 where the corn in popped. The popped corn is ejected through a door in the skillet onto a conveyor 5 where the unpopped corn is directed to a down spout 6 and the popped corn is directed forwardly into a suitable chamber 7 for storage. As the popped corn leaves the conveyor it is sprayed with butter from a butter spray 8 which is intermittent in its action, as will hereinafter be described.

The popped corn in the storage chamber is agitated by means of an agitator 9, whereby the butter is thoroughly mixed therewith. The amount of pop-corn to be contained in the storage chamber may be predetermined and automatically controlled by means of mechanism which will hereinafter be described.

When a purchaser desires some pop-corn a measuring device 10 is operated by a mechanism which is coin controlled and ejects a proper amount of popped corn from the storage chamber to a suitable chute, above which is positioned a salt container 11 which in turn operates to permit a supply of salt to be shaken over the popcorn as the latter is being ejected. The purchaser may receive a bag from a bag holder 12 and may position this bag at the dispensing chute to receive the pop-corn ejected from the chamber by the measuring device 10 through passageway 10a.

Having described the simple operation of the working of the machine, a detailed description of the structure and mechanism therefor will now be recited. The frame work comprises a rectangularly-shaped main base 13 formed preferably of a light metal casting, such as aluminum, or which may also be formed of a sheet metal reinforced by angle irons. A plurality of vertically-extending angle iron members 14 disposed at the corners of the rectangularly-shaped base 13 are secured together by a top frame work 15 which is bolted to the upper ends of the upright members. This frame work may be suitably enclosed as by means of a sheet metal casing or any other desirable means. However, it is preferable to provide the upper portion thereof with a plate glass in order to permit of a view of the mechanism of the device and the operation thereof.

*Corn feeding structure*

Referring more particularly to Figs. 2, 3 and 5 of the drawings, the corn-feeding structure and the mechanism therefor will now be described. The corn holder 1 is preferably of a spherical shape having a neck on its lower end. The neck of the holder 1, which is preferably made of glass, is disposed over the upper edge of a funnel-shaped section 16 situated in the upper portion of the machine. The upper portion 17 of the measuring device 2 engages the downwardly extending tubular portion 18 of the funnel-shaped section 16. A lower portion 19 of the measuring device 2 is secured to the upper portion 17 and extends into the upper end of the chute 3.

Disposed in suitable guides of the measuring device 2 and between the portions 17 and 19, as shown particularly in Figs. 5, 11, and 12, is a slidable elongated plate member 20 having a preferably circular aperture 21 therein, which latter, when in one position, permits a supply of fresh corn from the corn holder to enter the measuring device. The plate member 20 is provided with a downwardly extending side portion 22 formed preferably integrally therewith, which will be described more in detail. Immediately below the plate 20 is a second plate 23 having an aperture 23a rounded at one side and pointed at the other. This plate 23 is slidably mounted immediately under the plate 20, but is held against movement in the position shown in Fig. 11, by the spring 24 which is connected between a downwardly extending portion 25 of the plate 23 and the rear portion 19 of the measuring device 2. When the apertures 21 and 23a register, the corn is allowed to drop down into the portion 19 of the measuring device 2, but when the plate 20 is moved to a position similar to that shown in Fig. 11, wherein the two apertures are out of registration, no more corn is allowed to enter the measuring device.

It sometimes occurs that corn will become wedged between the edges of the two apertures while the plate 20 is being moved to closed position and if the plate 23 were stationarily mounted it would probably prevent further movement of the plate 20 and cause a subsequent jamming of the mechanism. With the construction shown, however, if any corn becomes wedged between the edges of the apertures 21 and 23a as the plate 20 is further moved to the right, the slide 23 is carried along therewith against the action of the spring 24, whereby there is no further admission of the corn into the measuring device 2. A third plate 26, as shown particularly in Fig. 12, is fixedly mounted on a stud shaft 27 journalled in an ear on one side of the portion 19 below the plates 20 and 23.

A horizontally extending crank-shaped member 26a having a roller 28 mounted on the free end thereof is fixedly attached to the one end of the stud shaft 27. The roller 28 engages and rides in the cam groove 29 formed in the vertical portion 22 of the plate 20.

When the aperture 21 is positioned over the measuring device 2 the roller 28 rides in the horizontal portion of the cam groove 29, thereby holding the plate 26 in closed position and preventing the fresh corn from dropping down into the chute 13. As the plate 20 is moved to the right, as shown in Fig. 11, so that the aperture 21 no longer registers with opening 23a, the roller 28 rides in the downwardly extending portion 30 of the cam groove 29 which allows the plate 26 to swing downwardly on the stud shaft 27, and the corn which was in the measuring device is then dropped down the chute 3 into the oven or skillet 4.

The plate 20 is reciprocated in the guideway formed between the portions 17 and 19 by means of an arm 31, one end of which is suitably secured to a bracket 31a, (as shown more particularly in Fig. 15) and the other end of which is pivotally connected to the link 32 which, in turn, is pivotally connected to the end of the plate 20. A roller 33 is secured to the face of the arm 31 at a point adjacent the fixed end thereof and rides in an irregularly-shaped cam groove 34a formed in the face of a disc 34. Rotation of the disc 34 causes the plate 20 to be reciprocated back and forth, and the plate 26 to be pivotally swung downwardly in a predetermined sequence, thereby operating the measuring device and allowing an ascertained amount of fresh corn to drop into the skillet as previously explained.

The chute 3, which connects the measuring device to the cooker, is preferably cast of a suitable metal such as aluminum and is of a desired shape, such that it will fit between the oven and the measuring device. This structure, including several parts of the measuring device and the chute, is suitably mounted on the top portion 15 of the frame work. The lower end of the chute 13 feeds into an opening in the top part of the skillet 4.

*Oven or skillet*

The oven or skillet 4, as viewed particularly in

Fig. 5, comprises a cylindrical casing 35 having a housing 36 attached to the bottom thereof which contains the heating element 36a disposed in a spiral slot in an insulating member. The upper end of the casing is enclosed by means of a cover 37 having an opening therein which is adapted to receive the lower end of the chute 3. A sleeve 38 extends down through a central opening provided therefor in the cover 37 to a point a spaced distance from the top of the housing 36 and is provided with internal threads at each end thereof. A shaft 39a having a beveled drive pinion 39 fixed thereon extends through the bearing 40 which latter is threaded into the upper end of the sleeve 38. A head 39b is formed on the shaft 39a and has a projecting portion for engaging a recess in the upper end of an agitator drive shaft 41. A bearing 42 is threaded into the threaded portion in the lower end of the sleeve 38 and has journalled therein the agitator drive shaft 41. A corn agitator 43 being preferably formed with four equally spaced fingers 44 and having a shaft portion 45 with threads on the end thereof receives in threaded engagement therewith the lower end of the drive shaft 41 and is rotated thereby. This construction also serves to support the oven from the supporting portion 15a and maintains it in proper position. The arms 44 of the agitator, when rotated, keep the corn in the skillet in motion so that it will not be burnt, and they also aid in expelling the popped corn from the skillet when the gate of the skillet is opened. The fingers 44 are preferably formed of cast metal.

The door 46 is disposed adjacent an aperture 47 in the lower portion and on the front side of the casing 35, it being mounted reciprocally therewith and guided in suitable guideways. As shown particularly in Fig. 16, a U-shaped arm 48 is slidably secured at its upper end in the guideway 49 of a bracket 50, which latter is, in turn, secured to the top frame work 15. The arm 48 is reciprocated by means of an arm 51 connected thereto at one of its ends, the other end thereof being fixedly mounted at 52 to a bracket 53 which is fixedly connected to the top frame work 15. A roller 54 is provided on the arm 51 for engagement with an irregular-shaped cam groove in the face of a disc 55, whereby the arm 51 receives its reciprocating movement. The lower ends of the U-shaped arm 48 are secured to each side of the door 46, and when it is desired to open the door, the arm 48 lowers and carries the door downwardly therewith to such a position that the upper portion of the door rests below the level of the bottom of the skillet.

It will be noted that the portion 55a of the cam groove holds the arm 51 in an upper position with the door 46 closed for a substantial period of travel of the cam 55 and the portion 55b holds the arm 51 in a partially lowered position with the door 46 partially opened for another substantial portion of the travel of the cam 55. The portion 55c of the cam groove merely opens the door fully for such a period of time as is necessary to sweep the unpopped corn out of the skillet, the popped corn having been mainly ejected therefrom as the door was partially opened.

*Conveying apparatus and storage chamber*

After the skillet has received a supply of corn and the corn has been popped therein, the door 46 is opened to permit the radially extending fingers 44 to eject the popped corn therefrom onto the conveyor 5. The conveyor 5 preferably comprises a pair of spaced chains 56 having spaced rods 57 extended therebetween, the latter acting as connections and pivots for the separate links of the chain. The conveyor extends over a suitable roller 58 which acts as a guide for the conveyor and is driven by means of a roller 59 supported on a shaft 60 which is preferably resiliently journalled in the housing 61, the roller 59 having teeth thereon for engaging the spaces between the rods 57.

A bearing member 60a having a rod 61a extending through an aperture in a fixedly mounted positioning member 62a, as shown in Fig. 2, is preferably positioned against the shaft 60 adjacent each end thereof. A spring 63a is placed about the rod 61a between the bearing member 60a and the positioning member 62a so as to maintain the conveyor chains tight. With this construction if popped corn or other objects become lodged between the conveyor chain and either of the rollers 58 or 59 the machine will not become jammed, but the springs 63a will allow the shaft 60 to move towards the roller 58 so the object will be released and will drop down through the chute 6.

The driving roller 59 is preferably disposed at the front end of the conveyor and is driven by a chain 62, which latter engages a sprocket wheel 63 on the shaft 60 and a sprocket wheel 65 on the shaft 66.

The conveyor is suitably enclosed in a housing 67 which is positioned adjacent the forward end of the skillet or oven 4. The upper end of the housing 67 is suitably enclosed by metal latticework 68, and the lower end is formed into a funnel shape 69 on which the conduit of the down spout 6 is secured. The forward and lower end of the housing 67 is open so that the popped corn carried by the conveyor 5 will drop down into the storage hopper or chamber 7 provided therefor, while the unpopped corn will drop down between the rods 57 into the down spout 6 as waste material.

The storage chamber 7 is formed by a hopper made preferably of sheet metal or cast aluminum. The hopper is suitably supported on a casting 70 which is preferably substantially smaller and rectangularly shaped and is, in turn, mounted on the main base 13.

The pop-corn in the hopper is agitated by means of the agitator 9 having three fingers which preferably extend substantially horizontally through the casting 70 and then are curved upwardly at their free ends. These fingers extend through guide openings in the casting 70 and are secured to a bracket 71, which latter is pivotally secured to a crank 72 mounted on a shaft 73. Upon rotation of the shaft 73 the fingers of the agitator 9 receive an oscillating motion to stir the pop-corn in the hopper so that it will collect at the dispensing device 10 and also will be thoroughly mixed with butter.

*Butter dispenser*

In order to supply the pop-corn with butter a butter box 74 is provided in the upper and front portion of the dispensing machine and comprises a rectangularly-shaped box of a suitable width to receive preferably a brick of butter. A butter pump 75 is preferably secured to the butter box on the outer side thereof and communicates with the butter box through an aperture 76 which extends from the butter box to the vertically disposed cylinder 77 of the butter pump. The lower end of the cylinder 77 is connected o a conduit 78, which latter extends to a spray nozzle 79, as shown in Fig. 14. The lower portion of the butter box 74 contains a heating element of any desired type which is preferably thermostatically controlled, both of which are of well known constructions and need not be illustrated in detail.

In order to provide a fixed feed for definitely determining the amount of butter to be sprayed over the pop-corn a spring-pressed plunger 80 is disposed in the upper end of the cylinder 77, and is secured to an upwardly extending rod 81. The rod 81 in turn is secured to one end of a preferably substantially horizontally extending arm 82, the other end of said arm being fixed to a support 83 secured to the upper framework 15. A roller 84 is mounted substantially midway of and on the arm 82 for engagement with a cam 85, the cam 85 being provided with a plurality of cam surfaces at one side for the operation thereof. (See particularly Fig. 1.) As the cam 85 rotates the cam surfaces thereof engage and intermittently lift the roller 84 against the tension of the plunger compression spring 86 which tends to hold the inner end of the arm 82 downwardly and causes a reciprocating movement of the plunger 80. By means of varying the number of cam surfaces on the cam 85 any desired amount of butter may be forced through the spray nozzle 79 onto the pop-corn as it passes out of the conveyor. By providing the cam 85 with cam surfaces on only one side thereof the pump is operated only during part of the revolution of the cam, and by this means butter is sprayed only when the popped corn is being carried under the spray nozzle by means of the conveyor 5.

A modified arrangement of the butter pump as shown in Figs. 18 and 19 will be hereinafter described in connection with the salt shaker.

Driving mechanism

The cam 85 is fixedly mounted on the shaft 87 on which the cams 34 and 55 are also mounted. On the extreme rear end of the shaft 87 are mounted also two switch cams 88 and 89 which operate the switches 88a and 90, as will be hereinafter described. The shaft 87 is supported on brackets 91. The shaft 87 is also journalled in a gear housing 92, the latter containing a worm driving gear which is fixed to the shaft 87 and is rotated by a worm pinion fixedly mounted on the shaft 66 which is supported by bearings preferably integrally formed with a casting 15a as shown in Fig. 3. A beveled gear 93 is fixedly mounted on the shaft 66 and engages the bevel pinion 39 mounted on the drive shaft 41, which latter extends within the oven 4 to rotate the radially extending fingers 44. On the end of the shaft 66 is another beveled gear 95 which meshes with a beveled gear 96 fixedly mounted on the upper end of the vertically extending shaft 97, the latter shaft being supported by and journalled in the casting 15a, and extending downwardly to be journalled in the base 13. The shaft 97 continues through the base 13 and has fixedly mounted on the lower end thereof a worm gear which engages a worm 98 mounted on a shaft 99 which is connected to the motor 100.

The operation of the mechanism thus far described is as follows: Upon rotation of the motor the shaft 97 is rotated by means of the worm 98 and the worm gear on the lower end of the shaft 97 to rotate the shaft 66. Rotation of the shaft 66 controls the actuation of the radially extending fingers within the skillet, the movement of the conveyor 5 and the rotation of the shaft 87. The shaft 87 in turn rotates the cams 34, 55, and 85 to operate, respectively, the plates 20 and 26, the door 46 of the oven and the plunger within the butter cylinder 77.

A beveled gear 101 is fixedly mounted on the shaft 97 adjacent the upper side of the base 13 and engages a beveled pinion 102 which is fixedly mounted on a shaft 103, the latter being rotatably mounted in bearing members 104 secured to the base 13. A sprocket wheel 105 shown particularly in Fig. 10—A is loosely mounted on the shaft 103 and has a clutch member 106 extending from one side thereof for engagement with the corresponding clutch member 107 on the shaft 103. The clutch members are normally held in engagement with each other by means of a compression spring 108 which is disposed between the bearing 104a and the other side of the sprocket wheel 105.

With reference now more particularly to Figs. 2 and 5 a chain 109 is mounted in engagement with the sprocket wheel 105 and extends forwardly to be mounted in engagement with a sprocket wheel 110, which latter is mounted on a shaft 111 extending through and mounted in the front end of the rectangularly-shaped casting 70. Means are provided on the shaft 111 to operate the salt shaker which will be hereinafter described.

The chain 109 engages a sprocket wheel 112 fixedly mounted on the shaft 73 to operate the agitator 9. An arm 113 adjustably mounted on the supporting member 114 has a roller 115 for engagement with the upper part of the chain 109 for taking up the slack therein. A second roller 116, disposed on the support 114 on the other side of the sprocket wheel 112, bears against the chain 109 in order to obtain and secure engagement between the chain and the sprocket wheel 112. The chain 109 is also in engagement with the sprocket wheel 117, which latter is mounted on a shaft 118, the latter shaft rotating the dispensing measuring device 10, which feeds an amount of popped corn to the receptacle 10a from which the purchaser receives it. The chain 109 thus controls, among other things, the operation of the salt agitator, the agitating fingers in the hopper and the dispensing measuring device 10.

Now referring more particularly to Figs. 8, 9, and 10, a pin 119 is secured to the chain 109 and extends a substantial distance from the face side thereof. When the motor is in operation and the chain 109 is actuated, the pin 119 will move forwardly to the left as shown in Fig. 9 with the chain 109 to a position where it strikes the bent-over end 120 of the rod 121 (Fig. 5), which rod extends rearwardly to be pivotally secured to the upper end of a lever 122. The lever 122 is fixed to a rocker shaft 123, which is rotatably mounted in brackets 124 secured to the base 13. As the end 120 of rod 121 is moved forward the pin 119 passes below and beyond the same. A rounded cam surface 125 is provided on one edge of the lever 122 for engagement with a projecting member 126 positioned on the chain 109 and spaced from pin 119. Upon a movement of the chain 109, the pin 119 moves therewith. When the cam surface 125 is engaged by the projecting member 126, the clutch is disengaged and further rotation of the sprocket wheel 105 is prevented. When, however, the lever 122 is pivoted rearwardly the sprocket wheel 105 and the chain 109 may move. The chain 109 moves forwardly until the pin 119 comes into engagement with the end 120 of the rod 121 and thereby pulls the lever forwardly again so that when the projecting member 126 again comes in contact with the cam surface 125, the sprocket wheel 105 is prevented from rotating further. The pin 119 and the bent-over end 120 of the rod 121 are so arranged that the pin engages the portion 120 to pull the lever 122 before the shaft 103 makes one complete rotation.

Carton device

Adjacent the opposite end of the shaft 103 is loosely mounted a wheel 127 having a clutch portion 128 adapted to engage the clutch portion 129, which is fixedly mounted on the shaft 103. A spring 130 urges the clutch portion 128 on the wheel 127 into engagement with the clutch portion 129 so that the wheel 127 will rotate with the shaft 103. A lever 131 is mounted on the shaft 123 and has a rounded cam surface 132 similar to the cam surface 125 on the lever 122. With the lever 131 in forward position, a projecting member 133 on the wheel 127 engages the cam surface of the lever and holds the wheel 127 with the clutch member 128 disengaged from the clutch portion 129. When the lever 131 is pivoted rearwardly on the rocker shaft 123 the spring 130 urges the clutch portion 128 into engagement with the clutch portion 129, causing the wheel 128 to rotate. However, as soon as the projecting member 133 comes in contact again with the cam surface 132 on completing one rotation of the wheel 127, further rotation of the wheel 127 is prevented.

Referring to Figs. 6 and 7, a link 134 is pivotally connected to a crank mounted so as to rotate with the wheel 127 adjacent the periphery thereof. The other end of the link 134 is preferably pivotally connected to the forwardly extending arm 135 which operates the carton feeding device. Another link 136 is pivotally connected to the forward end of the arm 135 and the other end thereof is pivotally connected to the vertically extending rod 137 which has its lower end enlarged as at 138 to engage the folded portion of the bags contained in the carton holder 139. A framework 140 is attached to the lower side of the base 13 and has a horizontally extending member 141 with an opening therein which serves to guide the rod 137 during movement thereof. The arm 135 is pivotally mounted intermediate the ends thereof on the support 142 so that rotation of the wheel 127 causes a reciprocal vertical movement of the rod 137. A pair of pulleys 143 is mounted on the frame 140 and another pair of pulleys 144 is mounted on the framework 145. The cartons to be dispensed are inserted in the carton holding member 139 so as to stand in a vertical position, as shown in Fig. 6. A carton follower 146 is positioned behind the bags and has cables 147 attached to each side thereof, which cables pass around the pulleys 143, then back over the pulleys 144 and then downwardly to be fastened to the weight-supporting member 148 to which is fastened a weight 149. By this means the carton follower urges the bags forwardly against the front part of the bag container 139. Any other means, such as springs or the like, may be used for urging the cartons against the dispensing end of the carton container. The bags are so positioned that when in the bag container a forward portion of each of the bags is folded upwardly so that when the rod 137 is moved downwardly, as previously explained, the engaging end 138 fits inside the upwardly extending flap and forces the bag down through the opening 150 provided in the forward end of the bottom of the bag container 139. The pivotally mounted door 151, which is kept in closed position by the spring 152, prevents access to the bags except by operation of the machine. With this construction, as soon as the lever 122 is urged rearwardly so as to permit rotation of the sprocket wheel 105 and the chain 109, the carton dispensing apparatus also operates and dispenses a bag to the purchaser. If desired, the carton container may be arranged in a vertical position with the cartons lying horizontally.

Salt shaker

In order to supply salt to the popped corn a salt shaker 11, as shown in Fig. 5, is positioned forward of the hopper 7. A shaft 153 is positioned in the upwardly extending slots 154 formed in the upper surface of the salt shaker so as to pivotally hold the upper end of the salt shaker. A T-shaped adjusting member 155 may be positioned in the forward part of the machine so that the stem portion thereof extends inwardly and under the bottom of the salt shaker 11. A spring 156 is positioned between the upper end of the cross portion of the member 155 and the salt shaker 11, while the lower end is fastened to the projecting portion 157 by a screw 158. Holes 159 are provided in the bottom of the salt shaker 11 to permit the escape of salt therefrom when the salt shaker is agitated. The shaft 111 which is rotated by the sprocket wheel 110 is formed with cam surfaces thereon at the end opposite the sprocket wheel 110, as shown at 160, against which the bottom end of the salt shaker is held by means of the spring 156 so that rotation of the shaft 111 causes the cam 160 to transmit a horizontal motion to the bottom of the salt shaker. By tightening the screw 158 the stem portion of the T-shaped member 155 is moved inwardly further under the salt shaker so that the holes 159 are covered during a large part of the horizontal movement of the shaker. By this means the amount of salt shaken onto the corn may be adjusted, tightening the screw 158, lessening the amount of salt and unscrewing the screw, allowing more salt to fall onto the corn. As the shaft 111 is controlled by the chain 109 which, in turn, is controlled by the sprocket wheel 105, the salt shaker is only agitated when the pop corn is being dispensed by the measuring wheel 10.

The modified arrangement of butter pump shown in Figs. 18 and 19 is operated by the shaft 111 which agitates the salt shaker so that both salt and butter are supplied to the corn while it is being dispensed, thereby insuring that the popped corn will be freshly salted and buttered when received by a purchaser. The butter pump shown in Figs. 18 and 19 is similar to the pump previously described with the exception that the nozzle 179 is replaced by a perforated tube and the operating mechanism is different. The butter box 74, to which the cylinder 77 is preferably connected, is mounted on the base 13 adjacent the casting 70. The conduit 78 which carries the melted butter from the pump, connects with a perforated tubing member 78a, which is closed at one end. This tubing member 78a is positioned between the sides of the casting 70 adjacent the lower end of the salt shaker 11. The rod 81 having a plunger at the lower end is pivotally connected to a lever 80a, which is pivotally mounted on the supporting member 81a, intermediate the ends of the lever. An offset cam wheel 82a is fixedly mounted on the shaft 111 and rotates therewith. An arm 83a connects the cam wheel 82a to the other end of the lever 80a, whereby rotation of the shaft 111 causes the plunger to pump butter through the apertures in the perforated tube 78a; at the same time, salt is supplied to the popped corn. While only one form of cam is shown for operating the butter pump, it is obvious that other means may be connected to the shaft 111 for causing a reciprocating movement of the plunger in the butter pump.

*Starting mechanism*

The starting mechanism preferably comprises a coin chute 161 (Fig. 2) having a centrally located slot therein. The coin chute guides the coin so that it falls into the coin-receiving member 162. At the lower end of the coin-receiving member is an elongated metal plate 163 which is suitably insulated from all other metal parts. An arm 164 is secured to the rod 165 and extends into the coin-receiving member 162 in alignment with the upper portion of the plate 163.

In the operation of this mechanism, a coin is dropped into the coin chute 161 and falls downwardly to complete an electrical circuit between the plate 163 and the arm 164 to energize a magnetic coil 166 and cause the latter to attract an armature 167.

Referring to Figs. 2, 3, and 9, the armature 167 is pivoted intermediate its ends at 168a so that as the end adjacent the magnet is pulled upwardly by the magnet, the outer end is moved downwardly. Attached to the outer end of the armature 167 is a rod 168, which is attached to one end of the latch 169. The latch 169 engages the rear side of the lever 122 and holds the same in forward position against the action of the spring 170 which is attached to the lower projecting portion 171 of the lever 122 and tends to pivot the lever 122 rearwardly, thereby rotating the rocker shaft 123 which pivots the lever 131. With this construction, when the outer end of the armature is pivoted downwardly, the latch 169 is operated so as to permit the spring 170 to pivot the lever 122, and the rocker shaft 123 rearwardly. As the lever 122 pivots rearwardly about the rocker shaft, it strikes a pin 172 which extends upwardly through an aperture in the bottom of the machine. The rod 172 is connected to a substantially horizontally extending arm 173, which arm, upon being depressed by operation of the pin 172, moves the link 173a downwardly to throw the switch trigger 174 of the switch 175, which closes the circuit. This circuit operates a relay and starts the motor 100, causing the machine to operate, as has been previously explained. A latch 176, having a portion 177 extending down through the bottom of the machine to be attached to the arm 173, is engaged by the pin 119 after the same has nearly made one complete rotation. The pin catches under the latch 176, pulling the arm 173 upwardly and thereby opens the switch 175. In the meantime, however, the switch cam 89 has closed the switch 90 so that the motor will continue running until the switch cam 89 has made one rotation. When the latch 169 has been released to permit the lever 122 to pivot rearwardly, this, at the same time, rotates the rocker shaft 123 and pivots the lever 131 rearwardly, thereby permitting the clutch member 128 to engage the clutch member 129. The wheel 127 thereupon makes one rotation, it being stopped by the projecting member 133 engaging the lever 131, which has been returned to normal position, along with the lever 122, by means of the pin 119 engaging the bent-over portion 120 of the arm 121. When the pin thus pulls the arm 121 forwardly, the latch 169 automatically engages the lever 122 and holds the same until it is again operated by insertion of a coin in the money slot. When the rocker shaft 123 is rotated, it pivots the angle arm 165a, causing the rod 165 to be pulled rearwardly and thereby allows the coin to drop into the coin box 118a. Due to the automatic stop on the chain 109, the chain rotates only enough to operate the salt shaker and hopper agitator and to dispense a proper amount of popped corn. And in the modified arrangement shown in Figs. 15 18 and 19, butter is also sprayed on the pop corn during this operation.

As has been previously explained, when the motor is started, due to the insertion of a coin in the coin slot, the whole machine operates, feeding corn to the oven, opening the oven gate, feeding it to the storage chamber and buttering the same during this operation, and also salting and dispensing the corn already in the storage chamber. It may sometimes be desirable to operate the machine merely as a dispensing device, without popping any more corn or pumping any more butter. For this purpose the switch cam 88 (Figs. 2 and 4) mounted on a cam shaft 87, is provided. The switch cam 88 operates a second switch, 88—A, which is connected to an electromagnet 178. The magnet 178 operates an armature 179, having a rod extending downwardly therefrom to engage the clutch-throwing member 180. A clutch is provided on the cam shaft 87 comprising the clutch portions 181 and 182, the portion 182 being attached to the driving end of the cam shaft 87. A spring 183 normally holds the clutch portion 181 in engagement with the clutch portion 182 so that the whole cam shaft 87 rotates with the operation of the machine. When the storage chamber for the popped corn contains a predetermined amount of corn, the clutch portion 181 is automatically thrown out of engagement with the clutch portion 182, by the following means: The apron 168 which extends downwardly in the storage chamber 7 is connected by an arm 184 (Fig. 5) to one end of the pivotally mounted support 185. A mercury tube contact switch 186 is mounted on the support 185 and is pivoted therewith upon movement of the apron 168 which is caused by an excess of corn in the storage chamber 7. The mercury tube contact switch 186 is ordinarily tilted so that no current flows therethrough, and is connected in series with the switch 88a, which remains on during part of the period of rotation of the cam. Thus, when the apron 168 is tilted outwardly by the popped corn in the storage chamber the circuit through the mercury tube contact switch 186 and the switch 88a is completed, thus energizing the magnet 178 to disengage the clutch portion 181 from the clutch portion 182. This prevents the driven end of the cam shaft 87 from rotating and the machine thus operates only as a dispensing mechanism.

It may sometimes be desirable to run the portion of the machine continuously which supplies the corn to the oven, opens the oven gate and butters the corn. A starting switch is provided for this purpose, which switch, when closed, causes the machine to operate continuously until a predetermined amount of corn is received into the storage chamber 7. Another mercury contact tube 187 is mounted on the support 185.

This switch is normally closed so that the current will flow therethrough. However, when the apron 168 is pivoted by the popped corn in the storage chamber, as previously explained, the tube 187 is tilted so as to break the circuit, thereby discontinuing further operation of the machine.

Wiring diagram

By referring to the wiring diagram in Fig. 17 of the drawings, electrical circuits for operating the machine will now be described. When a coin is dropped into the chute 161 an electrical circuit is completed through the plate 163 and the arm 164. The complete electrical circuit thus made obtains from one side of the line, through the plate 163, the arm 164 and the coil 166a of the magnet 166 to the other side of the line. The coil 166a is thus energized and attracts the armature 167 which is pivoted thereby to release the latch 169, and this, as previously explained, causes the switch 175 to close the relay and start the motor 100 and thereby the operation of the whole machine. As the machine is operated, causing rotation of the cam shaft 87, the switch cam 89 closes the switch 90. This switch then remains closed until the trigger 90a engages the slot in the periphery of the cam and thereby breaks the circuit, shutting off the motor.

It is to be understood that the chain clutch switch 175 is in parallel relation with the switch 90 so that the current will flow through the wires when either switch is closed. The switch cam 89 is so formed as to allow the current to flow through the switch 90 during one rotation thereof, which rotation is timed to feed the corn to the oven, pop and butter the same and convey it to the storage chamber 7. The current thus flows from one side of the line, through the chain clutch switch 175, the cam switch 90 and the relay 188 to the other side of the line. The relay acts almost instantly to complete the circuit through the motor 100 from one side of the line through the wire 189 across the relay to the motor and then to the other side of the line. Upon one rotation of the switch cam 89 the switch 90 is opened, thereby cutting off the current through the relay 188 and breaking the circuit through the motor. If it is desired to run the motor continuously, the starting switch 190 is closed, allowing the current to flow from one side of the line through the mercury contact tube 187, the starting switch 190 and then through the relay 188, which, as just explained, operates the motor. The current will continue flowing therethrough until the switch 187 is tilted by the action of the popped corn in the storage chamber on the apron 168 so as to tilt the tube 187 and break the circuit therethrough.

The switch cam 88 normally holds the switch 88a closed, except for the short period of time when the switch 90 is closed due to the trigger 90a engaging the notch in the switch cam. The mercury switch 186 is normally open so as to prevent current flowing therethrough and actuating the clutch magnet 178. When, however, the switch is tilted by movement of the apron 168 so as to close the circuit, the current will flow therethrough and through the cam clutch switch 88a to energize the clutch magnet 178 and then to the other lead wire.

The wiring is so arranged that when the master switch A is closed the current will flow through a resistance coil 36a in the oven 4. This circuit is also operated by a relay 192, a thermostatically operated switch 193 serving to automatically shut off the current through the oven when a desired temperature is reached. The current in this circuit flows through the switch 193 to operate the relay 192, to the other lead, thereby allowing the current to flow from one of the leads through the resistance heater 191 across the relay 192 to the other wire.

The butter device ordinarily requires no heat in addition to that supplied by the oven when the machine is operating. It is only necessary to use additional heat when the machine is started or additional butter is placed therein. In order to melt the butter in the butter container 8 a snap switch 194 is manually closed, allowing the current to flow therethrough and through the resistance wire heater 195, which is situated in the bottom of the butter container 8, to the other side of the line. In order to prevent the butter from becoming too hot a thermostatically controlled switch 196 is held in open position until the butter reaches a desired temperature, when the switch automatically closes, energizing the magnet 197 which operates an armature to open the switch 194, thereby acting as a safety device.

While but two embodiments of this invention are herein shown and described, it is to be understood that this device is not to be limited to the specific structure, since various modifications may be apparent to one skilled in the art without departing from the spirit and scope of this invention and, therefore, this invention is to be limited by the scope of the appended claims and the prior art.

I claim:

1. A measuring device for use in a pop corn vending machine, having a receptacle for containing a supply of corn, comprising a chamber for measuring a quantity of corn from said receptacle to be popped, said measuring chamber being provided with an opening in the top thereof for admitting corn from said receptacle, a plate member having an opening therein for intermittently registering with the opening in the top of said supply chamber, means for controlling the operation of said plate, a closure member in the bottom of said measuring chamber, and means connecting said first mentioned plate to said closure member to cause said closure member to be actuated to open position when said first plate is in closed position.

2. A measuring device for use in a pop corn vending machine, having a receptacle for containing a supply of corn, comprising a chamber for measuring a quantity of corn from said receptacle to be popped, said measuring chamber being provided with an opening in the top thereof for admitting corn from said receptacle, a plate member having an opening therein for intermittently registering with the opening in the top of said measuring chamber, means for controlling the operation of said plate, a closure member pivotally mounted in the lower portion of said measuring chamber, and means on said plate member connected to said closure member for operating said closure member to permit the corn in said measuring chamber to escape therefrom while said first mentioned plate is in closed position.

3. A measuring device for use in a pop corn vending machine, having a receptacle for containing a supply of corn, comprising a chamber for measuring a quantity of corn from said receptacle to be popped, said measuring chamber being provided with a plate having an opening therein, a second plate member positioned adjacent said first mentioned plate having an opening therein for intermittently registering with the opening in said first plate, said first plate being resiliently held against movement whereby if particles become wedged between the sides of said apertures during operation of said second plate said first plate is carried along with said second plate to completely close the entrance to said measuring chamber, closure means in the lower portion of said measuring chamber, and means for operating said closure means to permit the corn in said measuring device to escape therefrom while corn is prevented by said plates from entering the measuring chamber, and means for controlling the operation of said second plate.

4. A measuring device for use in a pop corn vending machine, having a receptacle for containing a supply of corn, comprising a chamber for measuring a quantity of corn from said receptacle to be popped, said measuring chamber being provided with an opening in the top thereof for admitting corn from said receptacle, a plate member having an opening therein for intermittently registering with the opening in the top of said measuring chamber, a closure member pivotally mounted in the lower portion of said measuring chamber and having a projecting member extending outwardly therefrom, said plate member having a downwardly extending portion with an angled slot therein adapted to receive said projecting member, whereby movement of said plate causes said closure member to be opened while the opening in said plate is in closed position, and means for controlling the operation of said plate.

5. A measuring device for use in a pop corn vending machine, having a receptacle for containing a supply of corn, comprising a chamber for measuring a quantity of corn from said receptacle to be popped, said measuring chamber being provided with an opening in the top thereof for admitting corn from said receptacle, a plate member having an opening therein for intermittently registering with the opening in the top of said measuring chamber, a closure member pivotally mounted in the lower portion of said measuring chamber and having a crank-shaped member attached to said pivot and lying in the plane of said closure member, said plate member having a side portion with a substantially horizontal slot therein with a downwardly extending end portion, said slot being adapted to receive the free end of said crank-shaped member whereby movement of said plate causes said closure member to be opened while the opening in said plate is in closed position, and a cam shaft for controlling the operation of said plate.

6. In a pop corn vending machine, having a receptacle for containing a supply of corn, a chamber for measuring a quantity of corn from said receptacle, an oven for receiving said corn from said measuring device, said oven having an opening in its wall and a door therefor, and a storage chamber for receiving the popped corn from said oven, means operated by a cam shaft for controlling the operation of said measuring device, a clutch for disengaging the cam shaft controlling the operation of said measuring device, and means for operating said clutch to disengage said cam shaft when a predetermined amount of popped corn is stored in said storage chamber.

7. In a pop corn vending machine, having a receptacle for containing a supply of corn, a chamber for measuring a quantity of corn from said receptacle, an oven for receiving said corn from said measuring device, said oven having an opening in its wall and a door therefor, and a storage chamber for receiving the popped corn from said oven, means operated by a cam shaft for controlling the operation of said measuring device, a clutch for disengaging the cam shaft controlling the operation of said measuring device, and means extending into said storage chamber for controlling the operation of said clutch to disengage said cam shaft when a predetermined amount of popped corn is stored in said storage chamber.

8. In a pop corn vending machine, having a receptacle for containing a supply of corn, a chamber for measuring a quantity of corn from said receptacle, an oven for receiving said corn from said measuring device, said oven having an opening in its wall and a door therefor, and a storage chamber for receiving the popped corn from said oven, means operated by a cam shaft for controlling the operation of said measuring device, a clutch operated by an electro-magnet for disengaging the cam shaft controlling the operation of said measuring device, and means for operating said magnet to disengage said cam shaft when a predetermined amount of popped corn is stored in said storage chamber.

9. In a pop corn vending machine, having a receptacle for containing a supply of corn, a chamber for measuring a quantity of corn from said receptacle, an oven for receiving said corn from said measuring device, said oven having an opening in its wall and a door therefor, and a storage chamber for receiving the popped corn from said oven, means operated by a cam shaft for controlling the operation of said measuring device, a clutch operated by an electro-magnet for disengaging the cam shaft controlling the operation of said measuring device, means on said cam shaft and means extending into said storage chamber adapted to act in conjunction for operating said magnet to disengage said cam shaft when a predetermined amount of popped corn is stored in said storage chamber.

10. In a pop corn vending machine, having a receptacle for containing a supply of corn, a chamber for measuring a quantity of corn from said receptacle, an oven for receiving said corn from said measuring device, said oven having an opening in its wall and a reciprocal door therefor, means for measuring a supply of corn to be delivered to said oven, a storage chamber for receiving the popped corn from said oven, and means for spraying butter on said popped corn, a cam shaft for controlling the actuation of said measuring means, said reciprocal door and said spraying means in a predetermined sequence, a clutch for disengaging said cam shaft from the driving means therefor, and means extending into said storage chamber for operating said clutch to disengage said cam shaft when a predetermined amount of popped corn is stored in said storage chamber.

11. In a pop corn vending machine driven by a motor, having an oven for receiving the corn to be popped, means for feeding a supply of said corn to said oven, a storage chamber for receiving the popped corn from said oven, and dispensing mechanism for dispensing said popped corn from said storage chamber, means for operating said dispensing mechanism comprising a shaft operated by a motor and having a clutch member thereon, a wheel loosely mounted on said shaft having a clutch portion adapted to engage said clutch member, means for urging the clutch portion on said wheel into engagement with said shaft clutch member, a rocker shaft having a member fixedly mounted thereon adjacent said wheel, driven means passing over said wheel and having a projecting portion thereon for engagement with said rocker shaft member for moving said wheel with the clutch portion thereon out of engagement with said clutch member to prevent further rotation of said wheel, means actuated by said rocker shaft for starting said motor, means for tilting said rocker shaft member and rocker shaft to start said motor and disengage said rocker shaft member from said projecting portion to permit one revolution of said driven member before said projecting portion reengages said rocker shaft member, and a second wheel driven by said driven means and mounted on a shaft to operate means for dispensing popped corn stored in said machine.

12. In a pop corn vending machine driven by a motor, having an oven for receiving the corn to be popped, means for feeding a supply of said corn to said oven, a storage chamber for receiving the popped corn from said oven, and dispensing mechanism for dispensing said popped corn from said storage chamber, means for operating said dispensing mechanism comprising a shaft operated by a motor and having a clutch member thereon, a wheel loosely mounted on said shaft having a clutch portion adapted to engage said clutch member, resilient means for urging said clutch portion on said wheel into engagement with said shaft clutch member, a rocker shaft having a lever fixedly mounted thereon adjacent said wheel, a chain member passing over said wheel and having a projecting portion thereon for engagement with said lever for moving said wheel with the clutch portion thereon out of engagement with said clutch member to prevent further rotation of the wheel, means actuated by said rocker shaft for starting said motor, means for tilting said lever and rocker shaft to start said motor and disengage said lever from said projecting member to permit one revolution of said chain member before said projecting member reengages said lever, and a second wheel mounted on a shaft to operate means for dispensing popped corn stored in said machine and rotated by said chain member, whereby one revolution of said chain member dispenses a predetermined amount of popped corn.

13. Carton delivering mechanism for use in a pop corn vending machine, having an oven for receiving the corn to be popped, means for feeding a supply of corn to said oven, a storage chamber for receiving the popped corn from said oven, and dispensing mechanism for dispensing said popped corn from said storage chamber, said carton delivering mechanism comprising a reciprocating member having the free end thereof adapted to engage a carton held in a carton container thereunder during the dispensing stroke of said reciprocating member and deliver the carton through an opening provided therefor, a pivotally mounted arm connected to said member at one end and to a link at the other, said link being connected to a wheel mounted on a shaft, and means for rotating said wheel to actuate said reciprocating member whenever the dispensing mechanism is operated.

14. A carton delivering mechanism for use in a pop corn vending machine, having an oven for receiving the corn to be popped, means for feeding a supply of corn to said oven, a storage chamber for receiving the popped corn from said oven, dispensing mechanism for dispensing said popped corn from said storage chamber, a carton delivering mechanism for supplying cartons for the popped corn, a drive shaft for operating said dispensing and said carton delivering mechanisms and a rocker arm having means thereon for controlling the operation of said mechanisms, said carton delivering mechanism comprising a vertically reciprocating rod having a flattened lower end adapted to engage a carton held in a carton container thereunder during the downward stroke of said arm and deliver a carton through an opening provided therefor, a pivotally mounted arm pivotally connected to said vertical rod at one end and to a link at the other, said link being connected to a wheel loosely mounted on a shaft and having a projecting portion thereon, a clutch member on said shaft for engaging said wheel with said shaft, a member mounted on said rocker arm for engaging said projecting portion to disengage said clutch, and means for causing the rotation of said shaft and tilting said rocker arm with the member thereon whereby said wheel may make one revolution.

15. In a pop corn vending machine, having an oven for receiving the corn to be popped, means for feeding a supply of corn to said oven, a storage chamber for receiving the popped corn from said oven, and dispensing mechanism for dispensing said popped corn from said storage chamber, means for supplying salt to said popped corn comprising a salt container pivotally held adjacent one end and having apertures in the bottom thereof, a shaft having projecting portions thereon for engaging a portion of said container, and resilient means for holding said container in engagement with said shaft whereby rotation of said shaft agitates said container.

16. In a pop corn vending machine, having an oven for receiving the corn to be popped, means for feeding a supply of corn to said oven, a storage chamber for receiving the popped corn from said oven, and dispensing mechanism for dispensing said popped corn from said storage chamber, means for supplying salt to said popped corn comprising a salt container pivotally held adjacent the top and having apertures in the bottom thereof, said container tapering inwardly adjacent the bottom, a shaft having projecting portions thereon for engaging the tapered portion of said container, and resilient means for holding said container in engagement with said shaft whereby rotation of said shaft agitates said container.

17. In a pop corn vending machine, having an oven for receiving the corn to be popped, means for feeding a supply of corn to said oven, a storage chamber for receiving the popped corn from said oven, and dispensing mechanism for dispensing said popped corn from said storage chamber, means for supplying salt to said popped corn comprising a salt container pivotally held adjacent the top and having apertures in the bottom thereof, a shaft having projecting portions thereon for engaging the lower portion of said container, resilient means for holding said container in engagement with said shaft, and a member projecting under said container whereby rotation of said shaft agitates said container so that the projecting member intermittently covers said apertures.

18. In a pop corn vending machine, having an oven for receiving the corn to be popped, means for feeding a supply of corn to said oven, and a storage chamber for receiving the popped corn from said oven, dispensing mechanism for dispensing said popped corn from said storage chamber, means for supplying salt and butter in predetermined amounts to said popped corn as it is being dispensed from said storage chamber, and means for operating said dispensing mechanism and salt and butter supplying means, said means causing the operation of said salt and butter dispensing means while said dispensing mechanism is being operated.

19. In a pop corn vending machine having an oven for receiving the corn to be popped, means for feeding a supply of corn to said oven, and a storage chamber for receiving the popped corn from said oven, dispensing mechanism for dispensing said popped corn from said storage chamber, a salt shaker for supplying salt to said popped corn, means for supplying butter to said pop corn, said salt shaker and butter supplying means being positioned substantially above said dispensing mechanism and adapted to operate simultaneously with said dispensing mechanism, whereby said popped corn is salted and buttered as it is dispensed, and means for operating said dispensing mechanism and said butter and salt supplying means.

20. In a popcorn vending machine, the combination of an oven for receiving the corn to be popped, means for measuring a supply of said corn to be delivered to said oven, a rotatable shaft for actuating said measuring means, a storage chamber, means for conveying the popped corn from said oven to said storage chamber, a butter box for containing a supply of butter, a heating element for melting said butter, a chamber in communication with said butter box for receiving a supply of melted butter therefrom, a plunger in said chamber for forcing said melted butter therefrom to be sprayed on said popped corn, and a cam on said shaft for operating said plunger.

21. In a popcorn vending machine, the combination of an oven for receiving the corn to be popped, means for measuring a supply of said corn to be delivered to said oven, a rotatable shaft for actuating said measuring means, a storage chamber, means for conveying the popped corn from said oven to said storage chamber, a butter box for containing a supply of butter, a heating element for melting said butter, a chamber in communication with said butter box for receiving a supply of melted butter therefrom, a spring pressed plunger in said chamber for forcing said melted butter therefrom to be sprayed on said popped corn, and a disc having a plurality of cam surfaces thereon for raising said plunger against the action of said plunger spring whereafter said plunger is actuated into its original position by said plunger spring.

22. In a popcorn vending machine, the combination of a hopper for containing a supply of corn, a chamber for measuring a quantity of corn from said hopper, an oven for receiving said corn from said measuring device, said oven having an opening in its side wall and a vertically reciprocable door therefor, a pair of plate members having apertures therethrough for alternately registering with said chamber, a storage chamber for receiving the popped corn from said oven, a pump member for spraying a supply of butter on said popped corn, and a cam shaft for controlling the actuation of said slidable plates, said vertically reciprocable door and said butter pump in a predetermined sequence.

23. In a popcorn vending machine, the combination of an oven for receiving the corn to be popped, means for measuring a supply of said corn to be delivered to said oven, a rotatable shaft, means between said rotatable shaft and said measuring means for actuating the latter, a storage chamber, means for conveying the popped corn from said oven to said storage chamber, a butter box for containing a supply of butter, a heating element for melting said butter, separate means for intermittently and forcibly ejecting a spray of melted butter on said popped corn, and means on said rotatable shaft for actuating said forcing means.

WILLARD A. PRIEST.